(12) United States Patent
Martin, IV

(10) Patent No.: US 7,085,280 B2
(45) Date of Patent: Aug. 1, 2006

(54) LOCATION OPTIMIZATION AND BASE ASSIGNMENT TOOL FOR CREATING OPTIMAL SWITCH-BASE STATION NETWORKS IN THE WIRELESS INDUSTRY

(75) Inventor: Edward Beau Martin, IV, Sammamish, WA (US)

(73) Assignee: Clearwire Corporation, Kirkland, WA (US)

( * ) Notice: Subject to any disclaimer, the term of this patent is extended or adjusted under 35 U.S.C. 154(b) by 1103 days.

(21) Appl. No.: 10/075,166

(22) Filed: Feb. 13, 2002

(65) Prior Publication Data

US 2003/0152045 A1 Aug. 14, 2003

(51) Int. Cl.
*H04B 7/24* (2006.01)

(52) U.S. Cl. ..................................... 370/408

(58) Field of Classification Search ................ 370/328, 370/254, 400, 401, 408, 422; 455/11.1, 446, 455/448, 449; 709/220, 221
See application file for complete search history.

(56) References Cited

U.S. PATENT DOCUMENTS 5,710,758 A * 1/1998 Soliman et al. ............. 370/241
5,740,366 A * 4/1998 Mahany et al. ............. 709/227
5,841,758 A   11/1998 Chen et al.
5,987,328 A * 11/1999 Ephremides et al. ........ 455/446

* cited by examiner

*Primary Examiner*—Huy D. Vu
*Assistant Examiner*—Duc Duong
(74) *Attorney, Agent, or Firm*—Michael J. Donohue; Davis Wright Tremaine LLP

(57) ABSTRACT

A method for optimizing a communications network such as a wireless telecommunications network, having central switch nodes and intermediate base station transport nodes, via a non-hierarchical clustering technique is provided. At least one of the central switch nodes may be fixed in location, the remaining central switch nodes being moveable. After an initial network configuration is obtained, distances from each base station to each central switch node are calculated and the nearest central switch node to each base station is determined. Each base station is assigned to its nearest central switch node. Thereafter, the moveable central switch nodes are relocated to the location minimizing the sum of the distances between each base station assigned to the switch and the switch. The foregoing steps are repeated iteratively until a stable environment is reached in which the sum of the distances between each base station and its assigned central switch node may not be reduced via the reassignment of a base station from one switch to another.

14 Claims, 6 Drawing Sheets

LOCATION OPTIMIZATION AND BASE ASSIGNMENT TOOL FOR CREATING OPTIMAL SWITCH-BASE STATION NETWORKS IN THE WIRELESS INDUSTRY

TECHNICAL FIELD

The present invention relates to network design, and more particularly to a method for optimizing a wireless network in terms of transmission costs by determining optimal switching node locations and base station assignments.

BACKGROUND OF THE INVENTION

Telecommunications systems use hierarchical networks to allocate resources and distribute communication traffic. The term "hierarchical networks" denotes a common network topology in "central" nodes are coupled to (and provide services to) numerous "intermediate" nodes, which in turn are each coupled to numerous end devices which provide services directly to customers. In fixed wireless networks in particular, high-bandwidth switching nodes, such as, for example, class V switches, correspond to central nodes of the fixed wireless network that serve a plurality of base stations. The plurality of base stations in turn correspond to "intermediate transport nodes" of the wireless network that directly serve individual customer premises equipment (CPE).

Since, in hierarchical networks, each switching node generally serves multiple base stations, there are typically far fewer switching nodes than base stations in a given network. As the cost of telecommunication transactions between a base station and a switching node is proportional to the distance between them, it is cost-effective for the switching nodes to be proximally located to the base stations and there is a need to centrally locate switching nodes amongst its constituent base stations.

Owing to the relative disparity in numbers of devices, the relationship between the switching nodes and the base stations can be more easily adjusted by changing the location of the relatively few switching nodes, than by adjusting the locations of the relatively greater numbers of base stations. Also, adjusting the locations of the switching nodes relative to the base stations is more feasible because it is not possible to move the base stations and maintain the same geographic coverage area.

Furthermore, and of particular importance, in any given network, some of the switching nodes may be fixed installations, which cannot be moved to accommodate an optimized network configuration. There is therefore a need to optimize the locations of those switches that are not subject to preexisting location constraints and whose location can be varied, subject to whatever fixed conditions, i.e. fixed switching node locations, that preexist in the network.

SUMMARY OF THE INVENTION

The present invention provides a method of optimizing a network configuration which includes a plurality of central switching nodes and a plurality of intermediate transport nodes. In the network configuration, each of the plurality of intermediate transport nodes is assigned to one of the plurality of central switching nodes, and at least one of the plurality of central switching nodes has fixed a fixed location.

According to an embodiment, the plurality of intermediate transport nodes are reassigned to a nearest central switching node to reduce telecommunication costs between the intermediate transport nodes and the central switching nodes where costs are directly proportional to transport node—central switching node distance. The locations of the plurality of central switching nodes that are not fixed are then modified. The steps of reassigning the intermediate transport nodes and modifying the locations of the non-fixed central switching nodes are repeated such that a sum of distances between the plurality of intermediate transport nodes and the respective central switching nodes to which each of the intermediate transport nodes are assigned is minimized and no further reassignments of the plurality of intermediate transport nodes take place.

The present invention also provides a method of optimizing a network including switching nodes and base stations. An initial network configuration of n switching nodes and a plurality of base stations is obtained, where a number m of the n central nodes are movable. Distances from each base station to each switching node are calculated and a nearest switching node to each base station is determined. Each base station is assigned to the corresponding nearest switching node and each of the m moveable switching nodes are then centered among the base stations assigned to the respective switching node. The steps of distance calculation, determination of the nearest switching node to each base station, assignment of the base stations, and centering of the switching nodes are repeated until a steady state is reached in which none of the base stations are reassigned between switching nodes.

DETAILED DESCRIPTION

According to the present invention, a network is optimized by changing the locations of central switch nodes, reassigning intermediate transport nodes to the relocated central switch nodes, and then continually repeating the change in location of the central switch nodes and reassignment of the intermediate base stations in an iterative process, until the sum of distances between all of the end nodes and the corresponding central nodes to which they have been assigned is minimized and no further reassignments will reduce the sum of the distances between the base stations and the switches. Prior to optimization, the location of one or more of the central nodes may be predefined as stationary or non-adjustable, thus taking into account common scenarios in which, due to costs, committed resources, and time constraints, one or more of the central nodes are fixed and cannot be relocated.

Figure 1:
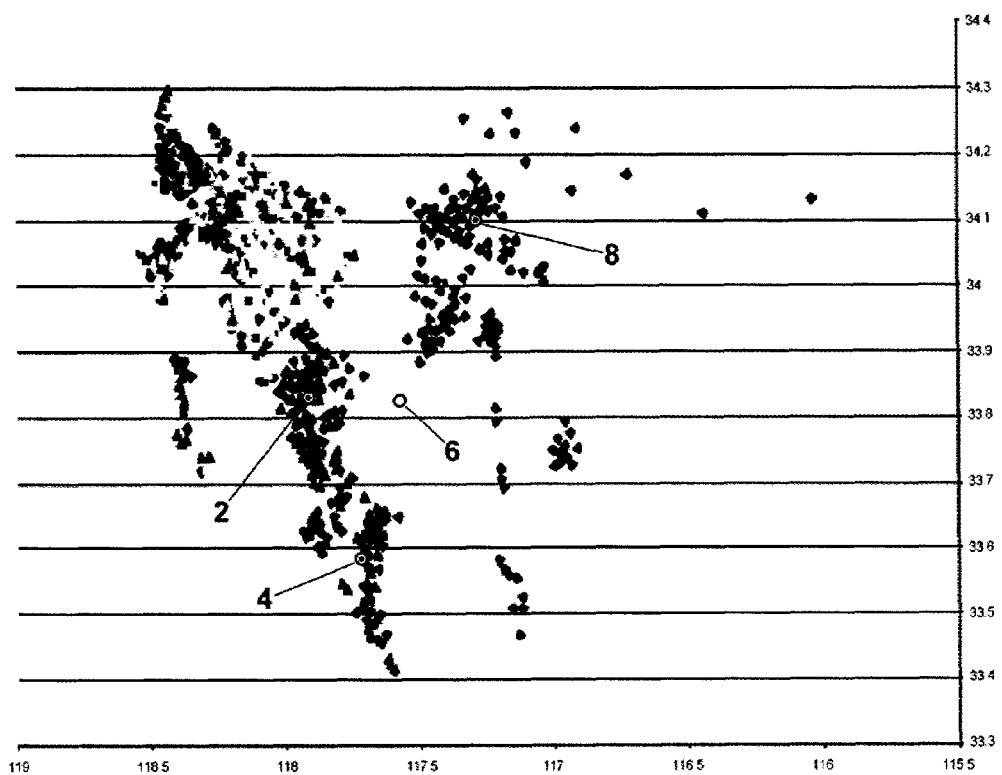
FIG. 1 is a geographical map of an exemplary unoptimized regional fixed wireless network.

FIG. 1 shows the geographical distribution of base stations and switching nodes in an original state of an exemplary fixed wireless network. In FIG. 1, switching nodes 2, 4, 6 and 8 are shown as bordered triangles. Also shown are numerous base stations whose shape and coloration designate the switching node to which they are assigned in the original state. In the upper right hand side of the figure a number of base stations are represented as dark diamonds. This group of base stations 12 is assigned to switching node 2. Similarly, the base stations represented as dark circles 14, and those represented as triangles 15 are assigned to switching node 4. Base stations represented as light circles 16 are assigned to switching node 6, while those represented as squares 18 are assigned to switching node 8. As can be discerned from the assignment scheme depicted, the assignments of base stations 12, 14, 15, 16 and 18, are somewhat haphazardly distributed with respect to the switching nodes 2, 4, 6, 8. For example, switching node 2 is situated in the middle of a cluster of base stations 14 assigned to switching node 4. Since it would be advantageous for the base stations to be assigned to the nearest switching node, the arrangement shown in FIG. 1 is clearly sub-optimal as the base stations in the cluster would be more properly assigned to switching node 2. Similarly, switching node 8 is located in the middle of a cluster of base stations 12 assigned to switching node 2, which is located much further from the cluster of base stations. This arrangement further indicates that the original switching node location and base assignment configuration is sub-optimal.

Figure 2:
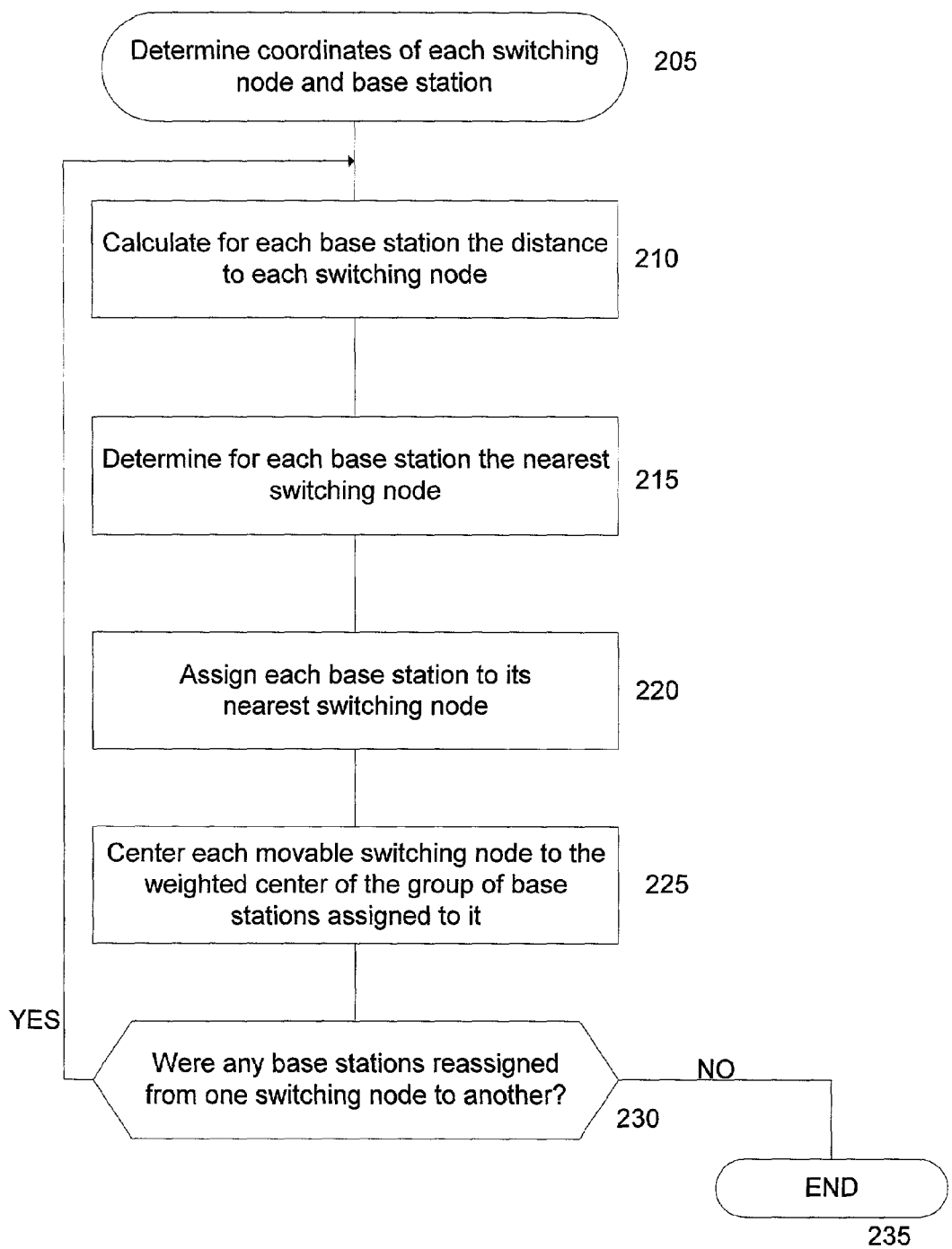
FIG. 2 is a flow chart of an embodiment of the optimization method according to the present invention.

FIG. 2 shows a flow chart of an embodiment of the switching node location and base assignment optimization method according to the present invention. At step 205, coordinates of an initial configuration of each of the switching node and base stations in a network system are determined in terms of latitude and longitude. The initial configuration includes fixed base station locations and may include fixed switching node installations, switching node construction sites in preparation or planned installation locations. As shown in FIG. 1, the initial configuration of the switching nodes 2, 4, 6, 8 and base stations 12, 14, 15, 16, 18 may be plotted in geographic space. In FIG. 1, the coordinates of regional fixed wireless network 1 range from 33.3 to 34.4 degrees in latitude and from −155.5 to −119 degrees in longitude.

In step 210, using the coordinate data, the distances from each of the base stations to each of the switching nodes are calculated. According to an implementation, the great circle distance, the distance between two coordinate points in a great circle arc along the surface of the earth, is determined, either in terms of statute or nautical miles. Sample code for determining the great circle distance between two points on the earth's surface is shown below.

```
// Postdist (Lat1, Lon1, Lat2, Lon2)
    if (Lat1 = Lat2 and Lon1 = Lon2) then
        Postdist = 0
    Else
        Riat1 = Radians(Lat1)
        Riat2 = Radians(Lat2)
        Rion = Radians(Lon2−Lon1)
        Postdist = 60*(180/Pi)*arccos(sin(riat1)*sin(riat2)+
            cos(Riat1)*cost(Riat2)*cos(Rion))
    End if
End Function //
```

Lat 1, Lat 2, Lon 1 and Lon 2, are the respective latitudes and longitudes of the two points. In further implementations, altitude and other factors may be taken into account in the determination of the distances.

After the distance from each base station to each of the switching nodes is calculated, e.g., from base station 12 to switching node 4, from the same base station 12 to switching node 6, from base station 14 to switching node 4, etc., for each individual base station, the distances between that base station and each of the switching nodes are compared in step 215, and the switching node having the shortest distance to the base station, the "optimal switching node," is determined. In step 220, the base station is assigned to the optimal switching node.

Figure 3:
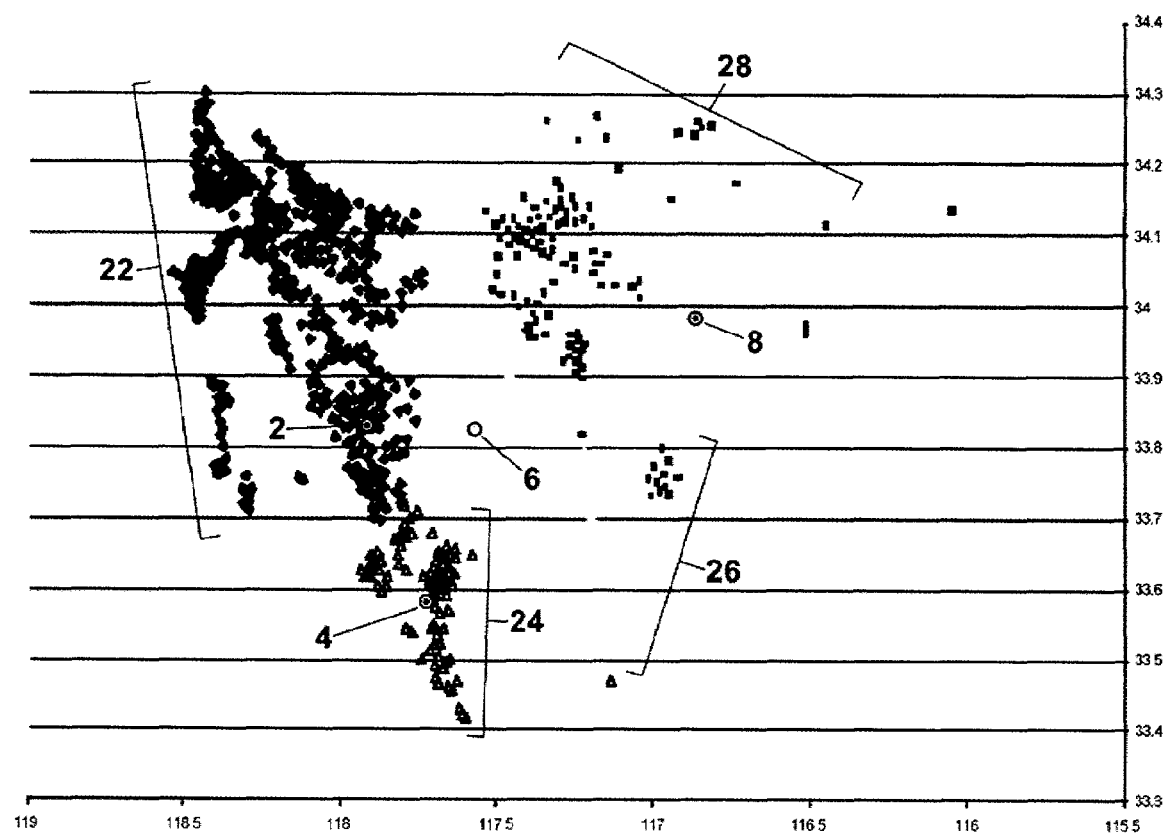
FIG. 3 is a geographical map that illustrates the first set of base station assignments in the fixed wireless network of FIG. 1 made according to an embodiment of the optimization method of the present invention.

FIG. 3 illustrates the assignments of each of the base stations to the switching nodes in the original configuration. As can be discerned, the majority of base stations (base station group 22, shown as dark diamonds) are assigned to switching node 2, due to the heavy concentration of base stations in the northwest region 35 of the map, and the fact that switching node 2 is the most northwesterly located of the switching nodes. At the southern tip of the concentrated band of stations along the western side of the map, a group of base stations 24, shown as circles, are assigned to switching node 4. A widely distributed group of stations 26, shown as triangles, is assigned to switching node 6, while in the northeastern region of the map, a group of stations 28, shown as squares, are assigned to switching node 8. It is noted regarding groups 26 and 28, that the respective switching nodes 2, 6 and 8 are not optimally located within the region that the groups 26, 28 occupy, but rather, are situated near edges of their respective assignment regions.

Because only the base stations assigned to a switching node communicate with that particular node, it is advantageous (as a first approximation) to situate the switching node at the center of the base station group assigned to the station to minimize the total distance between the base stations and their assigned switching node. Accordingly, in step 225 of FIG. 2, each of the switching nodes that can be relocated are moved to the center of their respective regions. In a given implementation, the center of a group of base stations assigned to a particular switch is determined by calculating an average latitude and average longitude for only the group of base stations assigned to the switch following an assignment or reassignment, the central position then having the average latitude and average longitude as its position coordinates on the regional map.

In general, if a network has n switching nodes, some number m, less than or equal to n, of the nodes are moveable, and n-m remain stationary. For illustrative purposes, it is stipulated that of the four switching nodes 2, 4, 6, 8 in FIG. 3, node 4 is stationary and the rest are adjustable.

Figure 4:
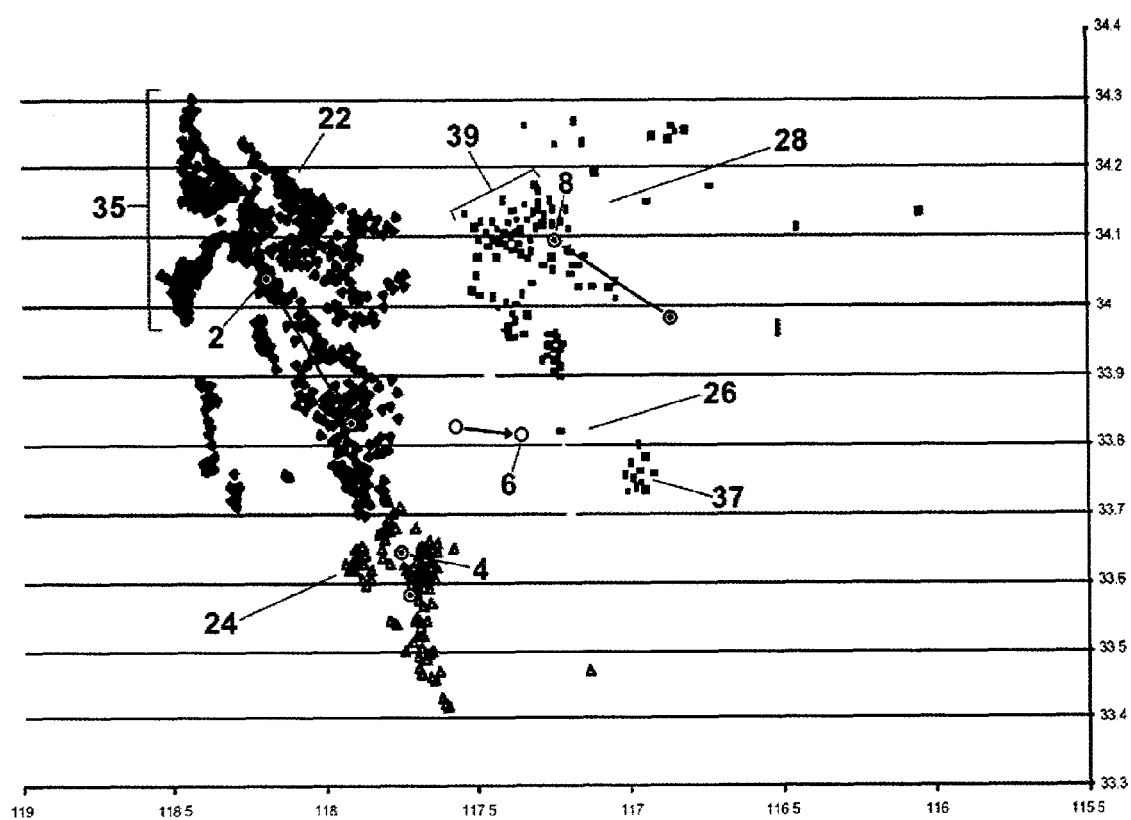
FIG. 4 is a geographical map that illustrates a first recentering of the switching nodes among the respective base station assignments of FIG. 3 according to an embodiment of the optimization method of the present invention.

FIG. 4 illustrates the network 1 after the moveable switching nodes 2, 6, 8 have been relocated to the center of their respective assigned station groups 22, 26, 28. Switching node 2 has moved considerably northwards into the concentrated northwesterly region 35. Switching node 6 has moved closer to the eastern concentrated cluster 37, and is therefore more optimally located. Switching node 8, like node 2, has moved into a relatively concentrated area 39, closer to the majority of base stations in its assigned group 28.

After the m moveable switching nodes are centered, it is first determined (step 230 in FIG. 2) whether any base stations were reassigned to different switching nodes during the assignment step. If at least one base station was reassigned, the process cycles back to step 210, in which the distances from each of the base stations to each switching node are recalculated, because the relocation of the switching nodes changes their distances from the base stations. Accordingly, some of the base stations may need to be reassigned to a different switching node that has moved closer to it than the switching node to which it was previously assigned, due to relocation. In this second iteration, the calculated distances between each individual base station and the switching nodes are again compared (step 215 in FIG. 2), the optimal switching node for assignment is determined, and each base station is reassigned (step 220 in FIG. 2) to its optimal switching node.

Figure 5:
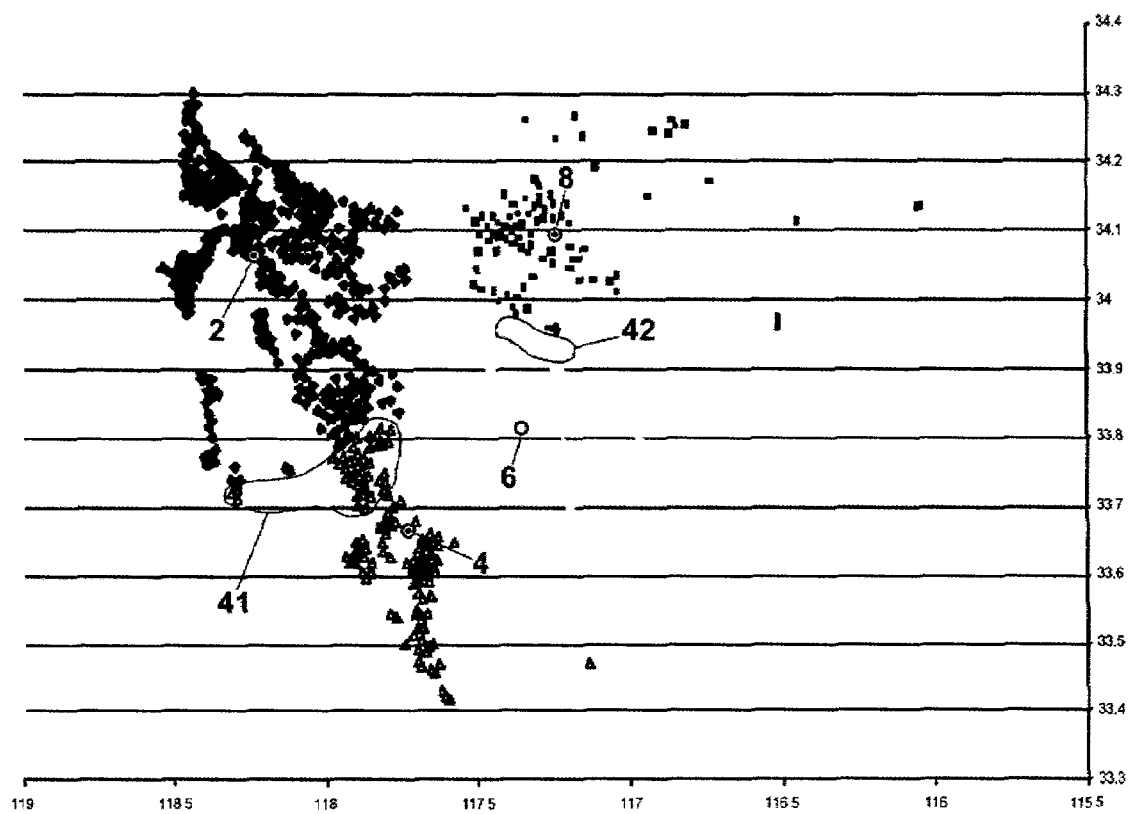
FIG. 5 is a geographical map that illustrates a second set of base station assignments after the recentering of the switching nodes shown in FIG. 4.

FIG. 5 illustrates the state of the network 1 after the reassignment of the base stations following the centering of the switching nodes in step 225. In the concentrated westerly side of the network, a number of base stations 41 formerly assigned to switching node 2, have been reassigned to switching node 4 even though switching node 4 has not moved. These base stations 41 have been reassigned because switching node 2 was moved relatively far to the north of these stations during centering. On the eastern side, both switching nodes 6 and 8 moved during recentering with the result that several base stations 42 have been reassigned from switching node 8 to switching node 6.

Generally, after a certain number of iterations of relocation (centering) of the moveable switching nodes and corresponding reassignment of the base stations, the base assignments reach a steady state, causing the adjustable nodes to no longer move during the centering step, with the result that the base stations no longer need to be reassigned. This point is reached in step 235 when, in step 230, it is determined that none of the base stations were reassigned from one switch to another. This steady-state condition is the optimal configuration of the network, in which each base station is assigned to the closest switching node.

Figure 6:
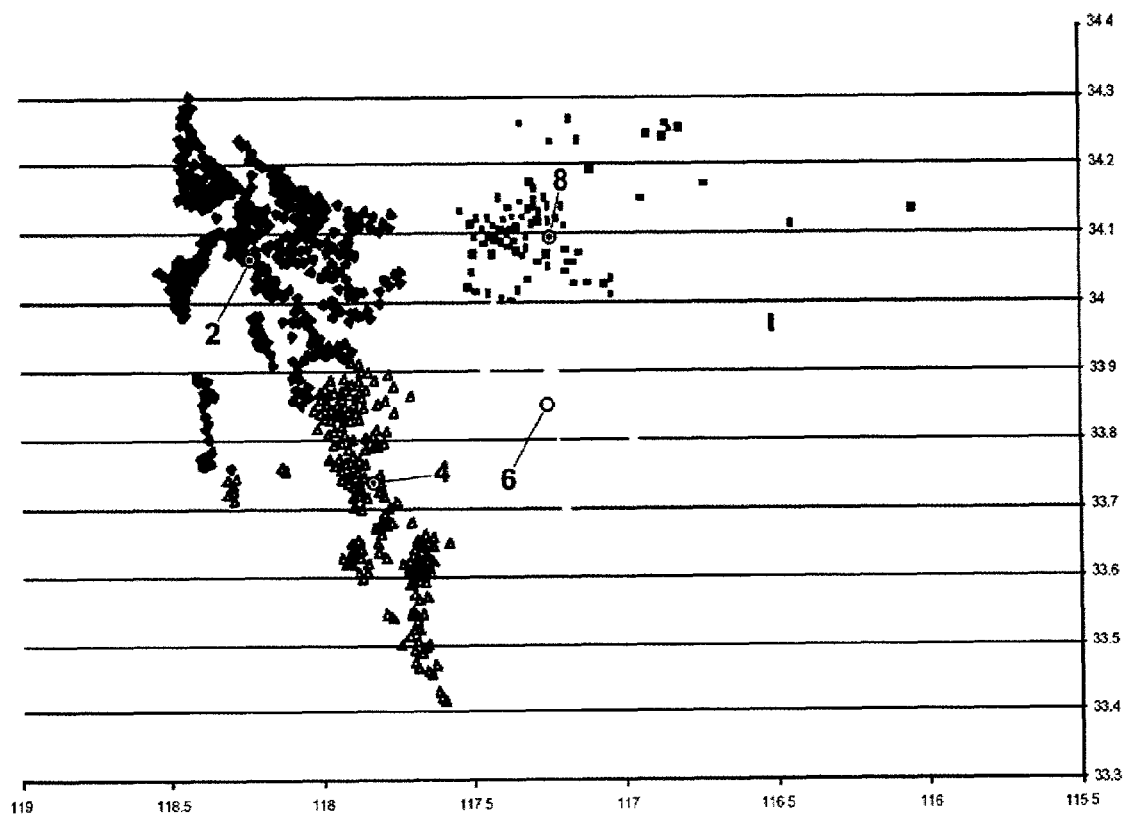
FIG. 6 is a geographical map that illustrates optimal switching node locations and base station assignments determined according to the present invention.

As a design tool, the method may also be used to indicate the optimal configuration that would result if all of the switching nodes were moveable, i.e., if switching node 4 were moveable. FIG. 6 shows the network configuration that would result from such hypothetical optimization. A comparison of FIG. 6 to FIG. 5 shows that switching node 4 has moved northwards by approximately 0.12 degrees in latitude, and closer to the other switching nodes 2, 6, 8. Switching node 6 has moved slightly to the northeast, compensating for the northward movement of node 2, but switching nodes 2 and 8 have not moved appreciably. Optimization results, such those shown in FIG. 6, can indicate the degree to which the constraints imposed by fixed nodes cause the configuration to vary from the hypothetical optimal configuration. As FIG. 6 demonstrates, the variance in overall configuration caused by fixed nodes can be less (e.g., with respect to node 2 and node 8) than might otherwise be expected.

In the foregoing description, the method and system of the invention have been described with reference to a number of examples that are not to be considered limiting. Rather, it is to be understood and expected that variations in the principles of the method and apparatus herein disclosed may be made by one skilled in the art and it is intended that such modifications, changes, and/or substitutions are to be included within the scope of the present invention as set forth in the appended claims. Furthermore, while the mechanisms described can be embodied in hardware within a computer processor, the invention is not necessarily limited thereby, and the programmed logic that implements the mechanisms can be separately embodied and stored on a storage medium, such as read-only-memory (ROM) readable by a general or special purpose programmable computer, for configuring the computer when the storage medium is read by the computer to perform the functions described above.

What is claimed is:

1. A method of optimizing a network configuration, the network including a plurality of switching nodes and a plurality of intermediate transport nodes, each of the plurality of intermediate transport nodes being assigned to one of the plurality of switching nodes, a location of at least one of the plurality of switching nodes being fixed, the method comprising:

reassigning the plurality of intermediate transport nodes to a nearest switching node;

modifying locations of those of the plurality of switching nodes that are not fixed; and repeating the steps of reassigning and modifying such that a sum of distances between the plurality of intermediate transport nodes and the respective switching nodes to which each of the intermediate transport nodes are assigned is minimized and no further reassignments of the plurality of intermediate transport nodes take place.

2. The method of claim 1, further comprising:

during modification of the locations of the plurality of central switching nodes, centering each of those of the plurality of switching nodes that are not fixed among a plurality of intermediate transport nodes assigned to the respective switching node.

3. A method of optimizing a network including switching nodes and base stations, comprising the steps of:

a) obtaining an initial network configuration of n switching nodes and a plurality of base stations, a number m of the n central nodes being movable;

b) calculating a distance from each base station to each switching node;

c) determining a nearest switching node to each base station;

d) assigning each base station to the corresponding nearest switching node;

e) centering each of the m moveable switching nodes among the base stations assigned to the respective switching node; and f) repeating steps b) through e) until none of the base stations are reassigned from one switching node to another during assignment.

4. The method of claim 3, further comprising the steps of:

before calculation of distances, determining coordinates of each of the switching nodes and base stations in the network; and during centering, for each movable switching node, determining a central location by calculating an average latitude and average longitude for the base stations assigned to the switching node.

5. The method of claim 3, wherein the distances are great circle distances along the earth's surface.

6. The method of claim 3, wherein the network is a fixed wireless telecommunications network.

7. An article comprising a computer-readable medium which stores computer-executable instructions for causing a computer system coupled to a system memory to:

a) obtain an initial network configuration of n switching nodes and a plurality of base stations, a number m of the n central nodes being movable;

b) calculate a distance from each base station to each switching node;

c) determine a nearest switching node to each base station;

d) assign each base station to the corresponding nearest switching node;
e) center each of the m moveable switching nodes among the base stations assigned to the respective switching node; and
f) repeat steps b) through e) until none of the base stations are reassigned from one switching node to another during assignment.

8. The article of claim 7, further causing a computer system to:
before calculation of distances, determine coordinates of each of the switching nodes and base stations in the network; and
during centering, for each movable switching node, determine a central location by calculating an average latitude and average longitude for the base stations assigned to the switching node.

9. The article of claim 7, wherein the distances are great circle distances along the earth's surface.

10. A network comprising:
at least one fixed central node located in at least one fixed location;
at least one moveable central node; and
a plurality of intermediate transport nodes, each end node initially coupled and assigned to one of:
a) one of the at least one fixed central nodes; and
b) one of the at least one moveable central nodes;
wherein the network is optimized by iteratively recoupling and reassigning each of the plurality of intermediate transport nodes to a nearest central node and relocating the movable central nodes to a central location among respectively assigned intermediate transport nodes.

11. The network of claim 10, wherein the network arrangement is configured such that a sum of distances between the plurality of intermediate transport nodes and the respective central nodes to which each of the intermediate transport nodes are assigned is minimized.

12. The network of claim 11, wherein the distances are great circle distances along the earth's surface.

13. A method of optimizing a network configuration, the network including a plurality of switching nodes and a plurality of base stations, each of the plurality of base stations being assigned to one of the plurality of switching nodes, a location of at least one of the plurality of switching nodes being fixed, the method comprising:
reassigning each one of the plurality of base stations to a switching node with which a communication cost factor is minimized;
modifying locations of those of the plurality of switching nodes that are not fixed; and
repeating the steps of reassigning and modifying such that the cost factor for communications between the plurality of base stations and the respective switching nodes to which each of the base stations are assigned is minimized and no further reassignments of the plurality of base stations take place.

14. The method of claim 13, wherein minimizing the cost factor of communications includes the step of minimizing a sum of distances between the plurality of base stations and the respective switching nodes to which each of the base stations are assigned.

* * * * *